Patented June 2, 1931

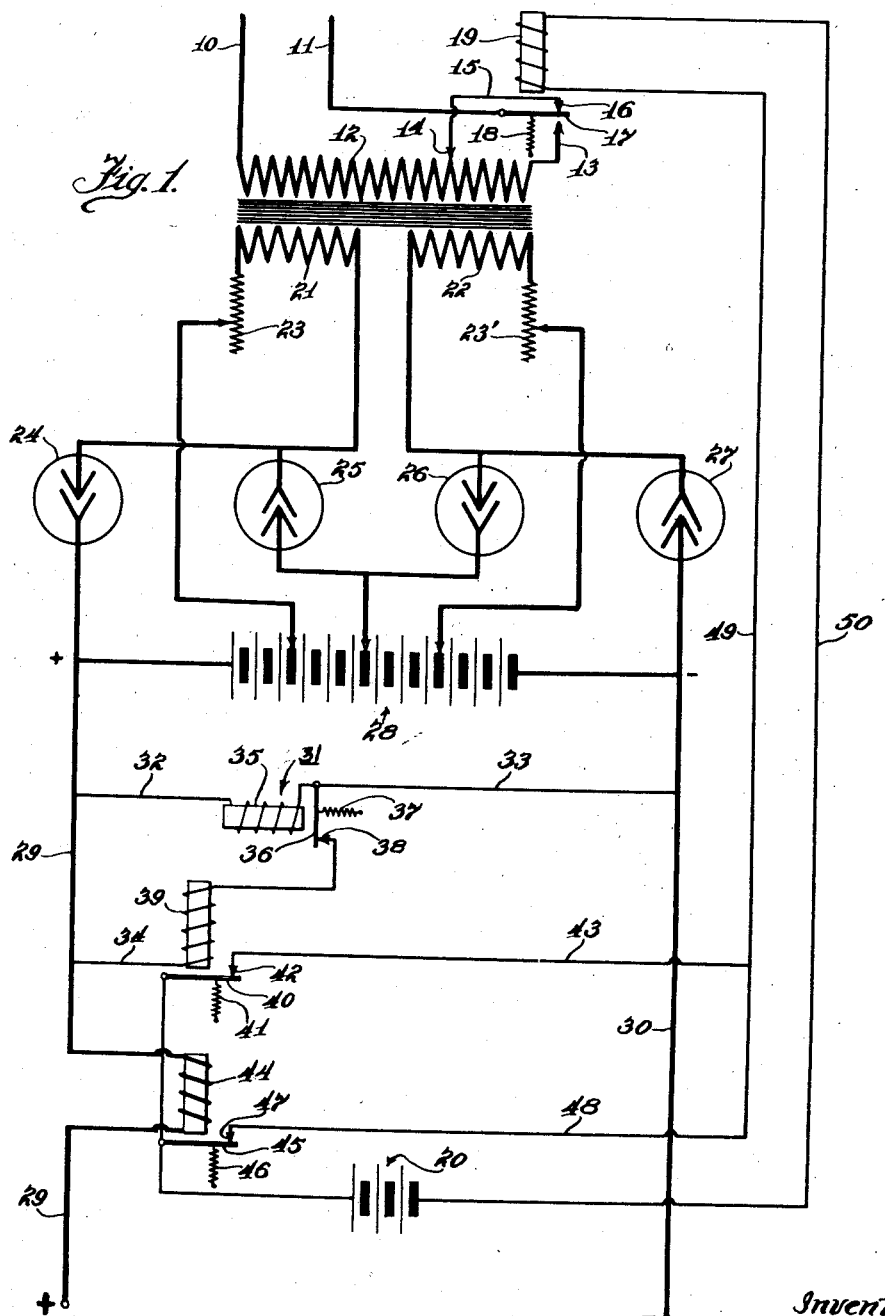

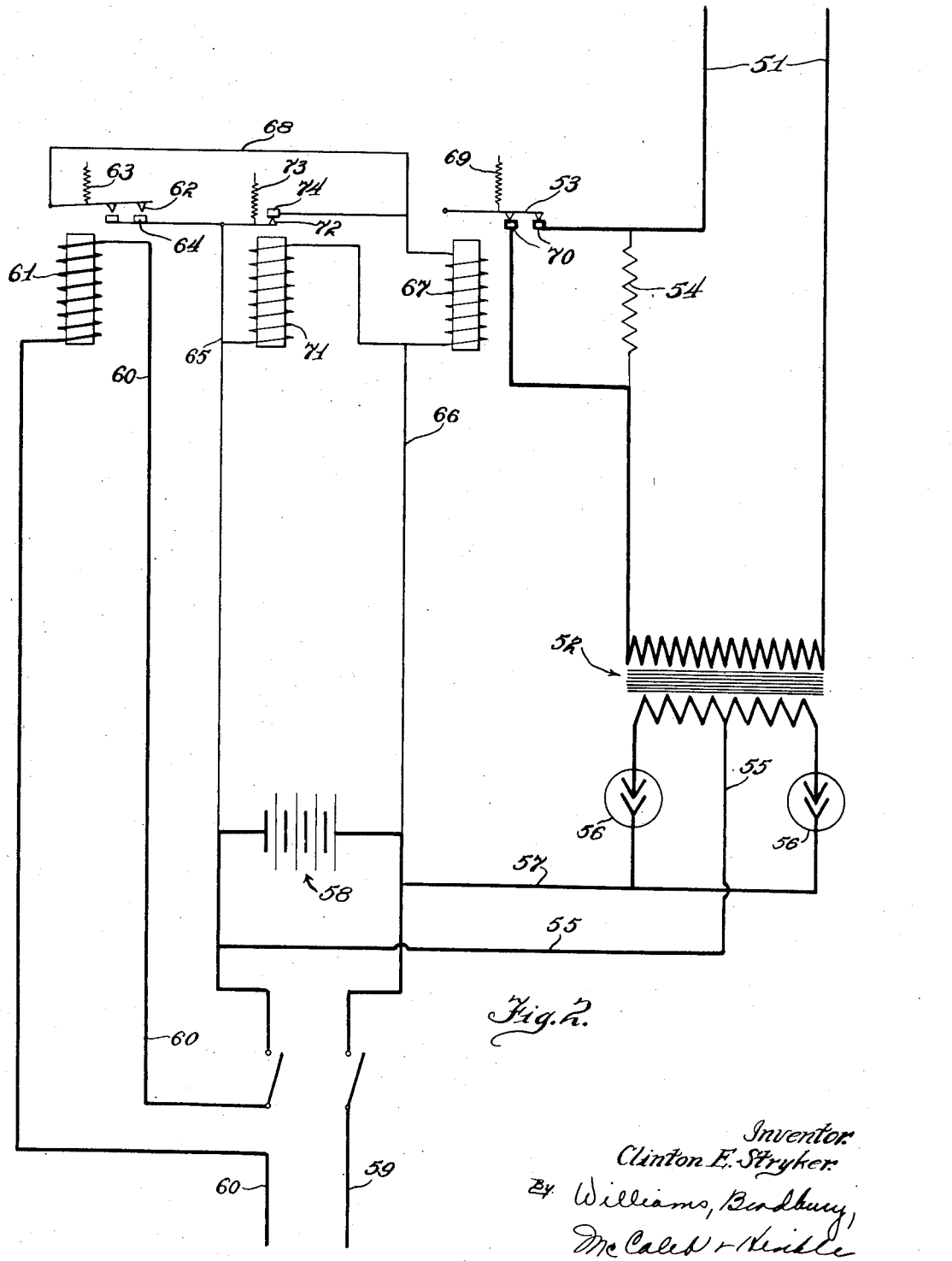

1,808,717

UNITED STATES PATENT OFFICE

CLINTON E. STRYKER, OF HIGHLAND PARK, ILLINOIS, ASSIGNOR TO FANSTEEL PRODUCTS COMPANY, INC., OF NORTH CHICAGO, ILLINOIS, A CORPORATION OF NEW YORK

AUTOMATIC RECTIFIER REGULATOR

Application filed June 18, 1927. Serial No. 199,701.

This invention relates to an automatic rectifier regulator and pertains more particularly to a means for regulating the charging current supplied to a storage battery whereby the battery is kept in a substantially uniform and charged condition.

When a storage battery is subjected to a heavy load, the voltage remains constant for a considerable length of time, but the chemical energy converted to electrical energy causes the cell to become rapidly discharged. Also, when a storage battery is discharged its voltage is diminished, which is objectionable not only from the standpoint of the load requirements, but from the standpoint of the life of the battery. The object of this invention is to provide a means for automatically regulating the charging rate of a battery charger responsive to the condition of the battery and to the load.

A further object of this invention is to provide a transformer with a plurality of taps and with a relay adapted to actuate a switch for selectively engaging said taps.

A further object of this invention is to provide a system of relays whereby one of a plurality of relays actuates another relay to vary the potential of the alternating current supplied to a rectifier circuit.

Other objects will be apparent as the detailed description of my invention proceeds.

In the drawings, which represent preferred embodiments of my invention, and in which like parts are referred to by like reference characters, Fig. 1 is a diagrammatic drawing of a rectifier circuit showing the tapped transformer winding.

Fig. 2 is a similar diagram showing a resistance cut out means for regulating the transformer voltage.

Referring to Fig. 1, wires 10 and 11 connect a suitable alternating current source, such as the socket of an ordinary electric lighting system, to the primary winding 12 of a transformer. One end of the primary winding is connected to contact 13. The winding is tapped at 14 by a wire 15 leading to a contact 16. A switch 17 is connected to conductor 11 and is adapted to be pulled against contact 13 by resilient tension spring 18, or to be pulled against contact 16 by relay 19, which is energized by current flowing from battery 20 through conductors 49 and 50. The secondary of this transformer is composed of two windings 21 and 22, one end of each of which is connected to a variable resistance unit 23 and 23'. These secondaries are connected to rectifying cells 24, 25, 26 and 27 in the conventional manner shown in the drawing, whereby storage battery 28 of 12 cells is charged in sections by the various rectifier cells.

The purpose of the variable resistance 23 is to provide a means for charging the various portions of the battery 28 uniformly. This circuit is well known, forms no part of the present invention, and no further description of it is deemed necessary.

The positive terminal of the battery is connected by a lead 29 to the positive terminal of the load. The negative terminal of the battery is connected by conductor 30 to the other load terminal. Across conductors 29 and 30 between the battery and the load I have bridged a volt meter relay, generally indicated at 31. Wires 32 and 33 connect conductors 29 and 30 respectively to a sensitive volt meter relay coil 35 which is adapted to pull a switch member 36 against the tension of a spring 37 away from contact 38, as shown in Fig. 1. When the battery voltage falls below a given amount, the tension of spring 37 will overcome the pull of the relay coil 35 and cause switch 36 to close the circuit through contact 38 and relay coil 39, which is connected to conductor 29 by a wire 34. The current flowing through coil 39 causes the switch 40 to be moved against the tension of spring 41 and to engage contact 42 which closes the circuit through 43, 49 and 50. This causes the relay 19 to be energized, whereby switch 17 is pulled against spring 18 to engage contact 16 to increase the current flowing in the primary winding. This causes an increased potential in the secondary windings and a corresponding increase in the charging rate supplied by the rectifiers to the storage battery.

When the battery becomes fully charged its voltage will increase to cause relay coil 35 to pull switch 36 away from contact 38 This de-energizes coils 39 and 19, whereby switch 17 again contacts at 13 to cut down the charging rate.

When a heavy load is applied to the battery a heavier charging current should be supplied, and to accomplish this I have supplied a relay coil 44 in series with the load. This coil is adapted to move switch 45 against the tension of spring 46 to engage contact 47 connected by a wire 48 to conductor 49. When an unduly heavy load is applied, the relay 19 is actuated to close the circuit through 16 of the transformer winding, whereby the current in the primary winding is increased to give a higher charging voltage in the secondary winding, whereby the charging rate is increased.

Fig. 2 shows a modification in which the load battery is also used to energize the relay circuits. In this modification a resistance cut out is used instead of a tapped transformer winding to furnish the variation in the charging rate.

An alternating current supply is connected by conductors 51 to a transformer 52 through a resistance cut out 53 and/or a resistance 54. The secondary winding of the transformer is tapped at the center by a conductor 55 which is connected to the negative terminal of the battery and the terminals of the secondary winding are connected through rectifiers 56 by conductor 57 to the positive terminal of storage battery 58.

Load wires 59 and 60 lead from battery 58 through a suitable load switch, as shown in the drawing. In wire 60 there is a coil 61 adapted to pull a switch 62 in opposition to the tension spring 63 against contact 64. Contact 64 is connected by a wire 65 to the negative terminal of battery 58. The positive terminal of the battery is connected by wire 66 to relay coil 67, which is in turn connected by wire 68 to the switch 62.

When the load current increases above a predetermined amount, the relay 61 closes the circuit at 64 through 65, 58, 66, 67 and 68, whereby relay 67 pulls switch 53 in opposition to spring 69 against contact 70, whereby the resistance 44 is cut out or shunted by a low resistance path to increase the current in the primary winding of the transformer and thereby raise the charging rate.

A relay coil 71 is bridged across the battery terminals and is adapted, when the battery voltage falls below a certain limit, to allow spring 73 to pull switch 72 against contact 74 to close the circuit through 58, 66, 67, 74 and 65 and thereby close the resistance cut out for the purpose above stated. In both of these examples it will be noted that the charging rate is automatically increased not only when the battery voltage falls below a predetermined amount, but also when an extra heavy load is imposed upon the battery which might cause it to be discharged at an injurious rate.

While I have disclosed preferred embodiments of my invention, I do not limit myself to the specific details shown except as defined by the following claim.

I claim:

In combination, a transformer having a primary winding and a secondary winding, a storage battery and a load connected therewith, a rectifier means for connecting said storage battery to said secondary winding through said rectifier, a voltage relay coil connected across said battery and a current relay coil connected in series with said load, switches adapted to be opened and closed by said relay coils, a third relay coil, connections whereby the coil of the third relay is energized when either of the first-named switches is closed, a third switch, and means operated by the closure of said last-named switch for increasing the voltage of said secondary winding to increase the charging current through said battery upon decrease of the voltage across said battery and upon increasing the load current.

In witness whereof, I hereunto subscribe my name this 7 day of June, 1927.

CLINTON E. STRYKER.